United States Patent [19]

Hutchison

[11] Patent Number: 5,129,747

[45] Date of Patent: Jul. 14, 1992

[54] KEYBOARD

[76] Inventor: Tom C. Hutchison, 866 - 30th Ave., San Francisco, Calif. 94121

[21] Appl. No.: 730,098

[22] Filed: Jul. 15, 1991

[51] Int. Cl.⁵ ................................................ B41J 5/10
[52] U.S. Cl. ..................................... 400/489; 400/486
[58] Field of Search ............... 400/489, 486, 482, 483, 400/484, 490

[56] References Cited

U.S. PATENT DOCUMENTS 4,804,279 2/1989 Berkelmans et al. ................ 400/94

Primary Examiner—Edgar S. Burr
Assistant Examiner—Anthony Nguyen
Attorney, Agent, or Firm—Douglas E. White

[57] ABSTRACT

Alphanumeric keyboard input apparatus has a mount and a plurality of keys on the mount arranged in four V-shaped rows, the four rows nested together, one within the other, so as generally to form a chevron. Alphanumeric indicia on the keys are arranged in QWERTY typing layout. At least two keys have base perimeters forming chevrons, one in a first row of the four rows and one in a second row of the four rows. Four keys of the first plurality have base perimeters forming irregular trapezoids, two in a third row of the four rows and two in a fourth row of the four rows.

16 Claims, 2 Drawing Sheets

KEYBOARD

FIELD OF THE INVENTION

This invention relates to input keyboards, more particularly to an ergonomically designed typing keyboard for use with computers, word processors, electric typewriters and the like.

BACKGROUND OF THE INVENTION

Standard keyboards for typewriters and computers have four parallel rows of keys: one numeric and three alphabetical. The rows are placed one on top of the other, but are staggered somewhat in order to shorten the finger-travel distance, or "throw", between keys in adjacent rows. Minimizing this distance is important, because the farther a finger must be thrown from its normal, or "home", position, the greater the chance for making a typing mistake. Furthermore, longer strokes require more muscle effort to execute, and thereby increase operator fatigue.

This parallel arrangement of straight rows of keys requires that the hands be held in a relatively unnatural position, namely, with the wrists held close together and the hands turned outward. At best, this position causes fatigue and strain — at worst, it may be associated with progressive deterioration and injury, such as carpal tunnel syndrome, which has been found to be increasing concomitantly with the increased used of computer and word processor keyboards.

Bending the rows of keys in the middle to form a V-shaped arrangement is known, although not widely adopted. This arrangement can allow the operator to turn his or her wrists outward somewhat so that the hands are held more directly in line with the forearms — a less fatiguing and safer arrangement.

Since the V-shaped rows are stacked one upon the other, such a keyboard, as a whole, may more properly be termed "chevron-shaped" (a chevron being a four-sided solid having a V-shaped top and a V-shaped bottom offset parallel to the top). However, these terms will be used more or less interchangeably herein, except where an explicit distinction must be made.

A problem with existing chevron keyboards is that they do not utilize the universally standard key arrangement known as the QWERTY keyboard. "QWERTY" stands for the names of the keys occupying the left side of the upper row of alphabetical keys. Therefore, existing chevron arrangements must be relearned by a typist whose only prior training and experience is on QWERTY keyboards. Furthermore, many chevron keyboards have such large gaps between the keys on alternate sides of the keyboard that they could not be readily modified for use by a QWERTY typist. They also would not be suitable for use in a keyboard wherein it is desired to minimize the typing area. This is the case, for example, with laptop, notebook and pocket computers.

Prior developments in this field may be generally illustrated by reference to the following patents:

| Patent No. | Patentee | Issue Date |
|---|---|---|
| 2,725,677 WG | A. Muther | Dec. 22, 1977 |
| 2,122,947 GB | W. Hawkins | Jan. 25, 1984 |
| 4,579,470 | C. Casey | Apr. 01, 1986 |
| 4,824,268 | H. Diernisse | Apr. 25, 1989 |
| 4,655,621 | R. Holden | Apr. 07, 1987 |

-continued

| Patent No. | Patentee | Issue Date |
|---|---|---|
| 332,476 GB | K. Marloth | Jul. 24, 1930 |
| 2,218,065 WG | G. Nawroth | Oct. 31, 1973 |
| 556,422 | A. Von Kunowski | Mar. 17, 1896 |
| 2,318,519 | C. C. M. Palanque | May 04, 1943 |
| 4,483,634 | W. U. Frey et al. | Nov. 20, 1984 |
| 4,597,681 | A. N. Hodges | Jul. 01, 1986 |
| 4,737,040 | T. Y. Moon | Apr. 12, 1988 |
| 552,611 WG | G. Vollberg | Jun. 15, 1952 |
| 2,122,947A GB | W. R. Hawkins | Jun. 25, 1984 |
| 4,814,747 | J. D. Wathor | Mar. 21, 1989 |
| 4,739,316 | S. Yamaguchi et al. | Apr. 19, 1988 |
| 4,476,462 | A. P. Feldman | Oct. 09, 1984 |
| 4,808,017 | H. F. Sherman et al. | Feb. 28, 1989 |
| 4,633,227 | W. A. Menn | Dec. 30, 1986 |

Patent WG 2,725,677 to Muther teaches a chevron keyboard where the space between the main key rows is filled with additional keys. However, the rows are not staggered and the key shapes are not altered to provide an interlocking fit.

Patent GB 2,122,947 to Hawkins teaches a thumb key whose shape is modified into that of a diamond so as to fit into the space between the key rows of a chevron keyboard.

U.S. Pat. Nos. 4,579,470 to Casey and 4,824,268 to Diernisse teach keyboards having something of a "V" shape and staggered keys. While the 3 470 patent shows one triangular key in the center, none of the keys are themselves chevrons, and the rows do not actually interlock.

The Frey patent, U.S. Pat. No. 4,483,634, is for a keyboard arrangement where a central keyboard is arranged in a V-shape. There is an unused triangular region in the center of the typewriter area. The keyboard also has a smaller keyboard on both the right and the left hand sides of the central keyboard. The rows are not unbroken "V"s. Two keys are chevron-shaped but are rotated 90 degrees. Thus, they extend from the bottom row up into the next row and do not facilitate the interlocking of rows.

The Hodges patent, U.S. Pat. No. 4,597,681, is for an adjustable keyboard wherein a standard keyboard is divided in half and each half can pivot around a pin such that the keyboard may be arranged on an angle in a V-shape. However, the rows break open upon pivoting. A tab key is chevron shaped, but also extends from one row up into the next row and does not facilitate the interlocking of rows.

The Palanque (U.S. Pat. No. 2,318,519), Hawkins (Great Britain No. 2,122,947A), and Vollberg (West German No. 552,611) patents also show keyboards where the keys are positioned on an angle to form a V-shape. However, the rows are broken by an unused, approximately triangular shaped region in the center of the keyboard, from which the keys radiate upward.

Not only does breaking of the rows prevent the effective staggering needed to shorten finger throw distance, it wastes space — in an age where smaller and smaller keyboards are being demanded.

The rest of the patents are representative of what is in the art.

SUMMARY OF THE INVENTION

The invention is a keyboard wherein the rows of alphanumeric keys are angled in the center, each forming a V-shape and overall forming a chevron shape.

An interlocking arrangement between the rows of keys at the center, where the angle is formed, optimizes the throw between keys of adjacent rows, thereby maximizing typing efficiency.

The interlocking arrangement is accomplished by changing the normally rectangular shapes of several of the keys. Some are themselves changed to chevrons, namely, the Y, B, and space-bar keys. The 6, 7, G, and H keys are formed into irregular trapezoids, i.e. their top and bottom edges are parallel whereas their sides are not.

Standard keyboards, as noted above, have alternating rows staggered with respect to each other in order to shorten the distance and optimize the angle of the path which one's fingers must travel between keys in adjacent rows. The interlock of the present invention allows the present invention to become the first V-shaped keyboard to optimize this path in the same manner.

The present invention provides a chevron-shaped QWERTY keyboard that will otherwise seem to be very little changed from the point of view of a QWERTY-trained operator. Therefore, the operator will require no additional training and will be able to accommodate his or her typing technique to the keyboard almost immediately.

The instant keyboard is so ergonomically efficient as to reduce the fatigue and discomfort which leads in present designs to errors and injury. It increases comfort, typing speed and accuracy. The operator's fingers are able to reach all keys quickly and without strain. The wrists are able to be held for long periods in their most natural, safe and effortless position.

As in other QWERTY keyboards, the most dextrous and agile finger, namely, the index finger, operates many more keys than the others, yet all of its keys are positioned at minimum distances and optimum angles with respect to from it.

The present keyboard has the added benefit of providing cursor control keys on both sides of the central typing area. This can be a boon to left-handed and ambidextrous typists.

FEATURES AND ADVANTAGES

An object of this invention is to provide alphanumeric keyboard input apparatus, which apparatus includes a mount (or casing) includes a first plurality of keys (the alphanumeric group) on the mount arranged in four unbroken V-shaped rows, the four rows nested together, one within the other, so as generally to form a chevron; and includes alphanumeric indicia on the keys arranged in QWERTY typing layout. At least one key has a base perimeter forming a chevron and lies wholly within one row, so as to facilitate the unbroken interlocking of the rows.

Another object is to provide at least two keys having base perimeters forming chevrons, one bearing the letter Y in a first row of the four rows and one bearing the letter B in a second row of the four rows.

Yet another object is to provide at least one of the keys of the alphanumeric group having a base perimeter forming an irregular trapezoid. Preferably, there are four keys of the alphanumeric group having base perimeters forming irregular trapezoids, one bearing the number 6 and one bearing the number 7 in a third row of the four rows, and one bearing the letter G and one bearing the letter H in a fourth row of the four rows.

Still another object is to provide a space bar having a chevron-shaped base perimeter which is nested together with the four rows at the bottom thereof. The space bar forms an additional V-shaped "row" of its own which is unbroken at the center.

Yet another object is to provide at least one of the keys with a base perimeter forming a rectangle. Preferably, the remainder of the alphanumeric keys have these rectangular (or square) bases, along with many of the punctuation and control keys.

Another object is to provide a second plurality (left cursor group) of keys on the mount, the second plurality located to the left of the alphanumeric group. The left cursor group is operably connected to means for controlling the movement of a cursor on a computer screen.

Yet another object is to provide a third plurality (right numeric/cursor group or keypad) of keys on the mount, the third plurality located to the right of the alphanumeric group. The keypad is operably connected to the cursor movement control means and also, alternatively — via the Num Lock (numeric lock) key to means for producing numeric keystrokes.

Another feature is an apparatus which is easy to use, attractive in appearance and suitable for mass production at relatively low cost.

Other novel features which are characteristic of the invention, as to organization and method of operation, together with further objects and advantages thereof will be better understood from the following description considered in connection with the accompanying drawing in which a preferred embodiment of the invention is illustrated by way of example. It is to be expressly understood, however, that the drawing is for the purpose of illustration and description only and is not intended as a definition of the limits of the invention.

Certain terminology and derivations thereof may be used in the following description for convenience in reference only and will not be limiting. For example, the words "upwardly," "downwardly," "leftwardly," and "rightwardly" will refer to directions in the drawings to which reference is made. The words "inwardly" and "outwardly" will refer to directions toward and away from, respectively, the geometric center of a device and designated parts thereof.

Figure 1:
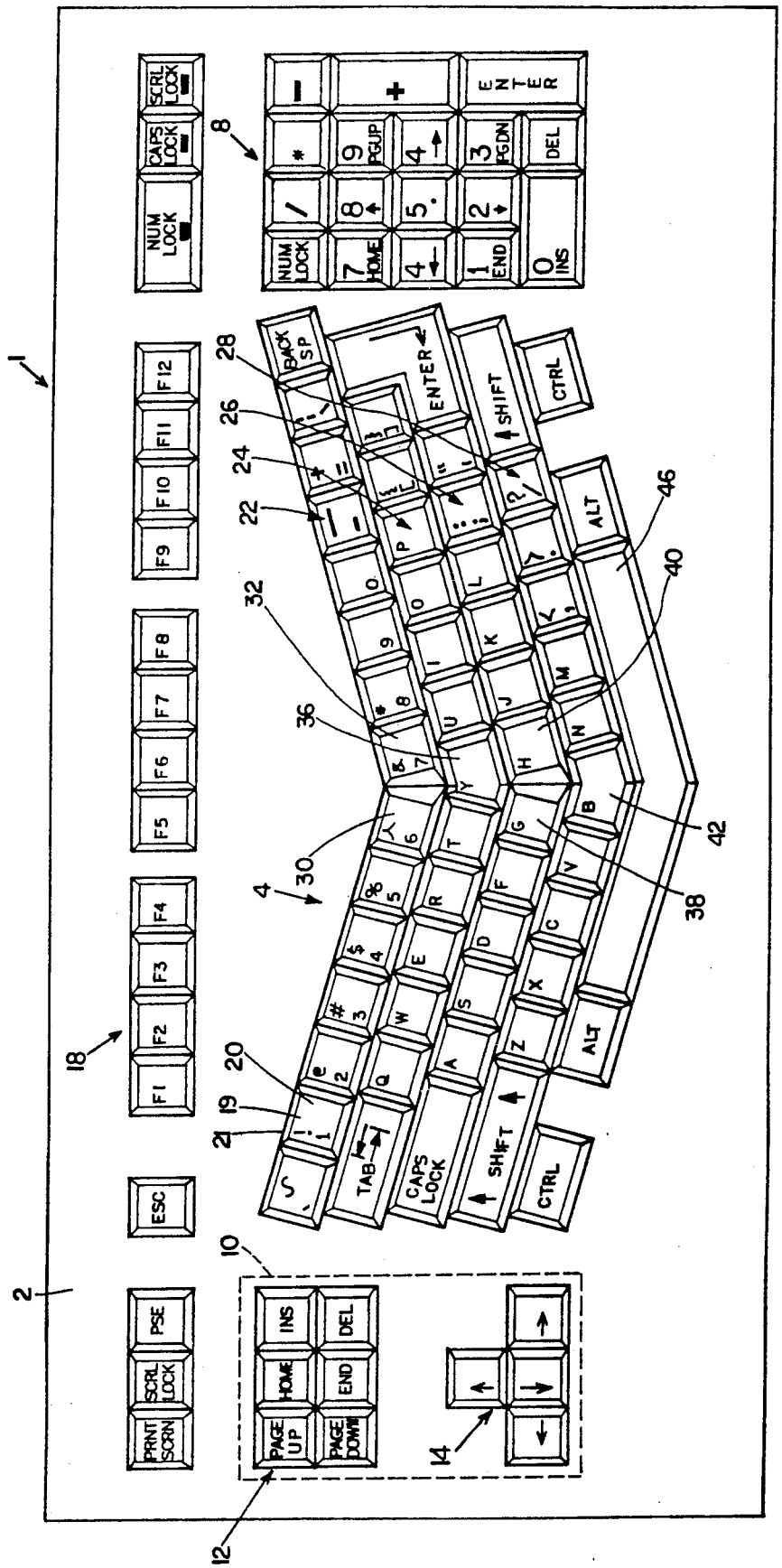
FIG. 1 is top or plan view of a preferred keyboard of this invention.
Figure 2:
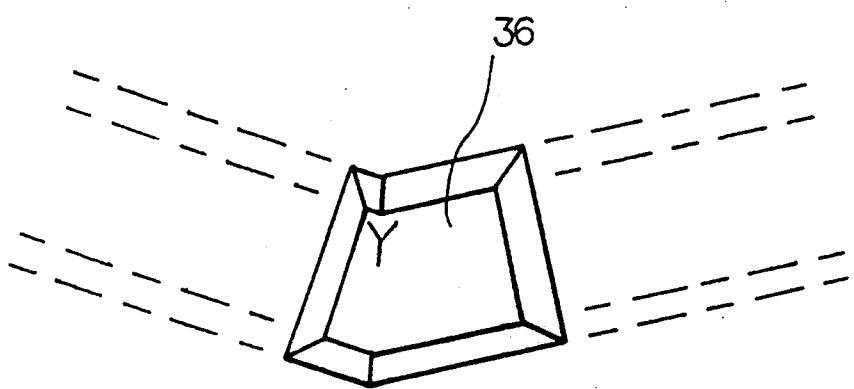
FIG. 2 is an enlarged plan view of the Y key of FIG. 1.

Drawing Reference Numerals 1 keyboard
2 mount or casing of 1
4 alphanumeric (typewriter) group
8 right numeric/cursor (keypad) group
10 left cursor group
12 area movement subset of 10
14 space movement subset of 10
18 function key group
19 alphanumeric key of 4
20 upper surface of 19
21 base perimeter of 19
22 numeric row of 4
24 first (top) alphabetic row of 4
26 second (home) alphabetic row of 4
28 third (bottom) alphabetic row of 4
30 6 key
32 7 key 36 Y key
38 G key
40 H key
40 B key
46 space bar

DESCRIPTION OF A PREFERRED EMBODIMENT

Referring to FIG. 1, there is illustrated therein a top view of a chevron-shaped QWERTY keyboard 1 of this invention. The keyboard 1 comprises a number of distinct key groups or clusters which are supported on a plastic or metal mount 2. The interconnection of the keys with the mount and the means for electrically signalling to a computer, word processor or electric typewriter which key has been struck are well known in the art and need not be separately described.

The alphanumeric (typewriter) key group 4 is more or less centrally located. To its right is the right numeric/cursor group 8, sometimes known as the "keypad". To the left of the alphanumeric group 4 is the left cursor group 10, which is made up of an area-by-area cursor movement subset 12 and a space-by-space cursor movement subset 14. Ins (insert) and Del (delete) keys are added to the area subset, as is normal in the art. Both of the groups 8 and 10 are connected to means for controlling the movement of a cursor on a computer screen, which means is known in the art.

While it has recently become common for there to be separate numeric/cursor and cursor only-groups, the placement of the cursor-only group 10 on the side opposite from the numeric/cursor group 8 is considered novel — normally, both cursor groups are placed to the right of the typewriter group. The current placement is advantageous in that it allows either hand to be used for cursor movement.

Computer function-controlling keys may be located in a straight-line function group 18 at the top of the keyboard 1. Alternatively, this group could also be V-shaped and could be nested into the top of the alphanumeric group 4.

Included, as is common, at various positions about the preferred keyboard shown in FIG. 1 are other keys for use with what are known as "IBM compatible" personal computers. Examples include Prnt Scrn (print screen), Scrl (scroll) Lock, Pse (pause), Esc (escape), and the like. The use of such keys is typically of such low frequency that it is deemed unnecessary to include them in more ergonomic positions on the chevron-shaped alphanumeric group 4, although that readily could be accomplished. Other computer control keys, such as Ctrl (control) and Alt (alternate), are used more frequently and therefore are positioned with the alphanumeric keys.

The alphanumeric group 4 basically comprises 58 keys: 10 numeric keys, 26 keys for the standard English Latin alphabet, and 22 other keys for punctuation and such controls as Shift, Space, Tab and the like.

Group 4 has four V-shaped rows nested together, one within the other, so as generally to form a chevron. The chevron shape is exact as to the top and bottom of the group 4. However, the sides are irregularly jagged. The rows of group 4 may be said to be unbroken. "Unbroken," as used herein, means that the distance between the keys does not vary substantially along the row, especially in the area of the point of the "V". Naturally, there are gaps between the keys, but these gaps are kept small enough to prevent foreign objects from entering the area beneath the keys. The numeric row 22 has the Arabic numerals and some punctuation and symbol keys. The alphabetic rows comprise the first or "top" row 24, the second or "home" row 26, and the third or "bottom" row 28. The actual content (or "symbol set") of these four rows is arranged in the same left-to-right order as the prominent QWERTY keyboard set. The space bar 46 itself, or together with opposed pairs of Ctrl and Alt keys, could be said to form a fifth V-shaped row.

A typical alphanumeric key 19, such as the 1 key, is rectangular (or square) around its base perimeter 21. It may taper upwardly to a slightly concave upper surface 20 of reduced size, which results in the 1 key being formed into the shape of a truncated pyramid. This general shape is known in the art.

However, in order to accommodate the QWERTY keyboard in a chevron shape and in the most ergonomic and compact layout possible, a number of keys, namely those at the center or intersection of the "V", have had their shapes changed in specific ways. Three keys (the Y key 36, the B key 42, and the space bar 46) have their base perimeters formed into chevrons. Four keys (the 6 key 30, the 7 key 32, the G key 38 and the H key 40) are formed into irregular trapezoids around their base perimeters. The remainder of the 36 basic alphanumeric keys 19, together with most of the punctuation and control keys of the typewriter group 4, are formed into regular rectangles at their bases.

It is to be noted that it is the shape of the key bases which is most critical for forming the keyboard of the present invention. All base perimeters 21 of the keys 19 should very nearly touch adjacent key base perimeters, in order that foreign objects not fall into the interior of the keyboard 1.

The upper surfaces 20 may be of any shape which is convenient and comfortable for the operator's fingers to rest on or to strike. Typically, the keys will taper upwardly into an upper surface shaped roughly the same as the base perimeter (as illustrated). However, due to the space gained by the taper, the top surfaces could form other shapes not illustrated. Thus, the B key 42, for example, could have a rectangular top surface rather than the chevron shape shown. Such a rectangle would be offset to the left side of the top of the key, since the B key is only struck with the index finger of the left hand. Similarly, the Y key 36 could be rectangular, square or oval on top and be skewed to the right for the convenience of the index finger of the right hand.

While the above provides a full and complete disclosure of the preferred embodiments of this invention, various modifications, alternate constructions, and equivalents may be employed without departing from the true spirit and scope of the invention. Such changes might involve alternate materials, components, structural arrangements, sizes, operational features or the like. For example, the keyboard could readily be adapted to other symbol sets and layouts, such as the layout known as the "Dvorak" keyboard. Furthermore, the positioning of the centrally located, chevron-shaped keys could be altered somewhat, e.g. the 7, H and N keys could be the chevrons and still accommodate the interlocking arrangement. Therefore, the above description and illustrations should not be construed as limiting the scope of the invention which is defined by the appended claims.

What is claimed is:

1. Keyboard apparatus including:

a mount;

a first plurality of keys on the mount arranged in a plurality of unbroken V-shaped rows, the plurality of rows nested together, one within the other, so as generally to form a chevron; and at least one key of the first plurality having a base perimeter forming a chevron and lying wholly within one row of the plurality of rows.

2. The apparatus of claim 1 wherein:

there are at least two keys of the first plurality having base perimeters forming chevrons, one wholly within a one row of the plurality of rows and one wholly within another one of the rows of the plurality of rows.

3. The apparatus of claim 2 wherein:

at least one of the keys of the first plurality has a base perimeter forming an irregular trapezoid.

4. The apparatus of claim 3 wherein:

there are four keys of the first plurality having base perimeters forming irregular trapezoids.

5. The apparatus of claim 4 further including:

an additional key of the first plurality having a generally chevron-shaped base perimeter and forming a fifth row nested together with the previous four rows at the bottom thereof.

6. The apparatus of claim 1 further including:

a second plurality of keys on the mount, the second plurality located to the left of the first plurality, the second plurality operably connected to means for controlling the movement of a cursor on a computer screen.

7. The apparatus of claim 6 further including:

a third plurality of keys on the mount, the third plurality located to the right of the first plurality, the third plurality operably connected to the cursor movement control means.

8. Alphanumeric keyboard input apparatus including:

a mount;

a first plurality of keys on the mount arranged in four unbroken V-shaped rows, the four rows nested together, one within the other, so as generally to form a chevron;

alphanumeric indicia on the keys of the first plurality arranged in QWERTY typing layout; and at least one key of the first plurality having a base perimeter forming a chevron lying wholly within one of the four rows.

9. The apparatus of claim 8 wherein:

there are at least two keys of the first plurality having base perimeters forming chevrons, one bearing the letter Y in one row of said four rows and one bearing the letter B in another row of said four rows.

10. The apparatus of claim 9 wherein:

at least one of the keys of the first plurality has a base perimeter forming an irregular trapezoid.

11. The apparatus of claim 10 wherein:

there are four keys of the first plurality having base perimeters forming irregular trapezoids, one bearing the number 6 and one bearing the number 7 in one of said four rows, and one bearing the letter G and one bearing the letter H in another of said four rows.

12. The apparatus of claim 11 further including:

a space bar having a chevron-shaped base perimeter and nested together with the four rows at the bottom thereof.

13. The apparatus of claim 12 wherein:

at least one of the keys of the first plurality has a base perimeter forming a rectangle.

14. The apparatus of claim 10 further including:

a second plurality of keys on the mount, the second plurality located to the left of the first plurality, the second plurality operably connected to means for controlling the movement of a cursor on a computer screen.

15. The apparatus of claim 14 further including:

a third plurality of keys on the mount, the third plurality located to the right of the first plurality, the third plurality operably connected to the cursor movement control means.

16. Alphanumeric keyboard input apparatus including:

a mount; and a first plurality of keys on the mount arranged in four V-shaped rows, the four rows nested together, one within the other, so as generally to form a chevron, wherein two keys of the first plurality have base perimeters forming chevrons, one in one of said four rows and one a second of one of said four rows, and four keys of the first plurality have base perimeters forming irregular trapezoids.

* * * * *